United States Patent [19]

Yokota et al.

[11] Patent Number: 4,558,441

[45] Date of Patent: Dec. 10, 1985

[54] DATA RECORDING AND REPRODUCING APPARATUS AND METHOD

[75] Inventors: Tsuneshi Yokota, Kawasaki; Akira Nakagawa, Yokohama, both of Japan

[73] Assignee: Tokyo Shibaura Denki Kabushiki Kaisha, Kawasaki, Japan

[21] Appl. No.: 474,979

[22] Filed: Mar. 14, 1983

[30] Foreign Application Priority Data

Mar. 15, 1982 [JP] Japan .................................. 57-40606

[51] Int. Cl.$^4$ ................................................ G11B 7/00
[52] U.S. Cl. .................................................... 369/59
[58] Field of Search ...................... 369/59; 375/80, 82; 329/106; 360/29, 30, 39

[56] References Cited

U.S. PATENT DOCUMENTS

4,293,944 10/1981 Izumita et al. .
4,308,612 12/1981 Miyauchi et al. .
4,423,498 12/1983 Kimura et al. ..................... 365/59 X

FOREIGN PATENT DOCUMENTS

52-77702 6/1977 Japan .
1051518 12/1966 United Kingdom .

Primary Examiner—Robert L. Richardson

Attorney, Agent, or Firm—Cushman, Darby & Cushman

[57] ABSTRACT

In a data recording and reproducing apparatus and method, a modulator is provided for MF-modulating recording data and a pulse converter generates a pulse signal having pulses which have a predetermined pulse width and which are synchronous with the leading and trailing edges of the pulses of the signal from the modulator. An optical head, a peak detector, a flip-flop circuit and a demodulator are also provided. The optical head radiates a high-energy laser beam, or a recording beam, to an optical disk in response to the pulse signal from the pulse converter, thereby recording the data on the disk. To reproduce the data, the optical head continuously emits a low-energy laser beam to the disk. The beam reflected from the disk is converted into an electrical signal. The peak detector detects the peaks of the electrical signal and generates a pulse signal having pulses which are synchronous with the peaks of the electrical signal. The flip-flop circuit generates a pulse signal having pulses which rise in synchronism with the trailing edges of the pulses of the signal from the peak detector and whose widths correspond to the intervals of the peaks of the electrical signal. The demodulator MF-demodulates the pulse signal from the flip-flop circuit, thereby reproducing the recording data.

13 Claims, 9 Drawing Figures

DATA RECORDING AND REPRODUCING APPARATUS AND METHOD

BACKGROUND OF THE INVENTION

This invention relates to a data recording and reproducing apparatus and method, and more particularly to an apparatus and method for writing data on and reading data from an optical disk by illuminating the disk with a light beam while the disk is rotating.

An optical disk which is a medium for mass data storage is currently attracting much attention. The disk is used in, for example, an image information filing system. In the system, the recording surface of the disk is illuminated with a laser beam while the disk is spinning, whereby image information is recorded on or reproduced from the disk. During recording, image information is converted into digital data and the digital data are subjected to pulse-width modulation, thus providing pulse-width-modulated signals. A recording beam, or a high-energy laser beam, is intermittently applied on the recording surface of the optical disk in accordance with the pulse-width-modulated signals. The recording beam produces pits of varying lengths along a spiral or circular track on the disk. During reproduction, a reproducing beam, or a low-energy laser beam, is applied on the track. The portion of the reproducing beam reflected from the track is converted into image signals by a photosensor of an optical head.

If an optical disk unit is used in an image information filing system, it must be made small, light, inexpensive and easy to operate. An optical disk unit which fulfills all these requirements cannot perform data recording or data reproduction with high precision, however. This is because, for example, a focussing operation of the optical head is not stable and also the optical disk warps and has no uniform light-sensitivity. It is therefore difficult to form pits of uniform size in the recording surface of the disk. If a reproducing beam is not correctly focused on the track, image signals corresponding to the beam reflected from the track will be erroneous and the data reproduced from the image signals will be incorrect.

SUMMARY OF THE INVENTION

An object of the present invention is to provide a data recording and reproducing apparatus which can correctly record data on an optical disk and correctly reproduce it from the disk.

In an apparatus according to this invention, a modulating means pulse-width-modulates data to be recorded. A pulse converting means generates a write pulse signal of pulses having a given width in response to the leading and trailing edges of a pulse signal from the modulating means. A driver drives a light beam radiating means in response to the write pulse signal from the pulse converting means. The light beam radiating means radiates a high-energy light beam toward an optical disk, thus forming pits in the recording surface of the disk. To reproduce data from the optical disk, the light beam radiating means radiates a low-energy light beam onto the recording surface of the disk. The photosensing means converts the beam reflected from the disk into an electrical signal which is supplied as a read signal. The peak detecting means detects the peak components of the read signal and generates a read pulse signal having pulses which correspond to the peak components of the read signals. A reproducing means converts the read pulse signal into the reproduction data corresponding to the recorded data.

DETAILED DESCRIPTION OF THE PREFERRED EMBODIMENT

Figure 1:
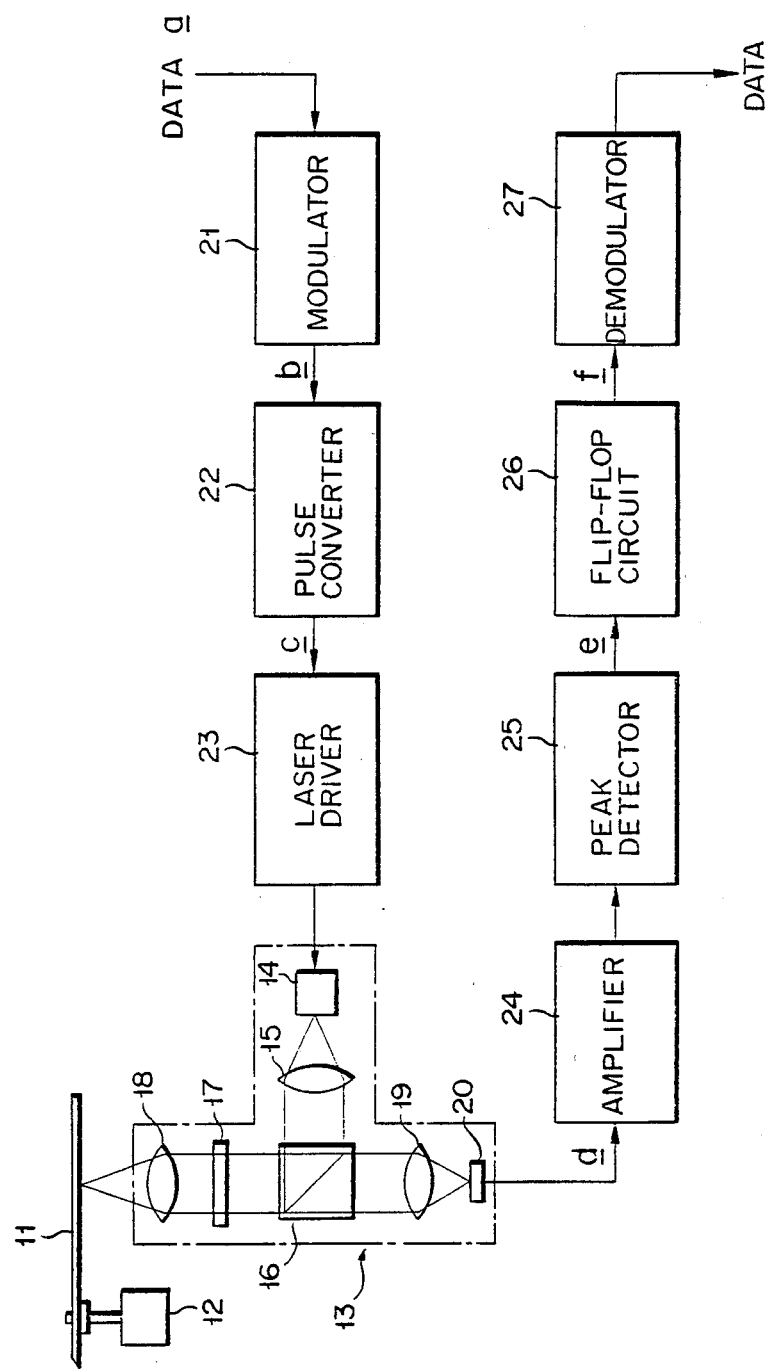
FIG. 1 is a block diagram of a data recording and reproducing apparatus according to the present invention.

FIG. 1 shows a data recording and reproducing apparatus according to the invention. A spiral pregroove is cut in the recording surface of an optical disk 11 which is used in the apparatus. The disk 11 is rotated by a motor 12 housed in an optical disk unit. An optical head 13 is located facing the recording surface of the optical disk 11. The head 13 is moved by a linear motor (not shown) in the radial direction of the disk 11.

The optical head 13 is comprised of a semiconductor laser 14, a collimator lens 15, a beam splitter 16, a quarter-wavelength plate 17, an objective lens 18, a focusing lens 19 and a photosensor 20. The semiconductor laser 14 emits a laser beam toward the collimator lens 15 in response to a drive signal. The laser beam passing through the collimator lens 15 is applied to the beam splitter 16. The beam splitter 16 guides the beam to the objective lens 18 via the quarter-wavelength plate 17. The objective lens 18 focuses the laser beam so that the beam forms a beam spot having a diameter of about one micron on the recording surface of the optical disk 11. The beam reflected from the disk 11 is guided to the focusing lens 19 through the objective lens 18, quarter-wavelength plate 17 and beam splitter 16. The focusing lens 19 focuses the beam on the light-receiving face of the photosensor 20. The photosensor 20 converts the beam into an electrical signal, i.e., a read signal.

A pulse width modulator 21 is supplied with data to be recorded on the optical disk 11, e.g. digital image data, and pulse-width-modulates the data by e.g. modified frequency modulation (MFM). The output of the pulse width modulator 21 is connected to the input of a pulse converter 22, e.g. a monostable multivibrator. The pulse converter 22 generates pulses having a predetermined width in synchronism with the leading and trailing edges of the respective pulses from the pulse width modulator 21. The output of the pulse converter 22 is coupled to the input of a laser driver 23. The laser driver 23 generates drive signals in response to the pulses from the pulse converter 22. The drive signals are supplied to the semiconductor laser 14, thus driving the laser 14.

The output of the photosensor 20 of the optical head 13 is connected to the input of a peak detector 25 through an amplifier 24. The peak detector 25 detects the peak components of the read signal from the photosensor 20 and generates pulses at time intervals which correspond to the intervals of the peak components. The output of the peak detector 25 is connected to the input of a pulse generator, e.g. a flip-flop circuit 26. The output of the flip-flop circuit 26 is coupled to the input of a pulse width demodulator 27.

The operations of the apparatus, i.e., data recording and data reproduction, will be described with reference to the timing chart of FIG. 2.

Data Recording

The motor 12 rotates the optical disk 11 at a predetermined speed. The optical head 13 is set at a specific position with respect to the disk 11. A recording mode switch (not shown) is closed. The semiconductor laser 14 then radiates a low-energy laser beam. The laser beam passes through the collimator lens 15, beam splitter 16 and quarter-wavelength plate 17 and reaches the objective lens 18. The lens 18 focuses the low-energy laser beam on the recording surface of the optical disk 11. The beam is reflected from the disk 11 and supplied to the photosensor 20 through the objective lens 18, quarter-wavelength plate 17, beam splitter 16 and focusing lens 19. The photosensor 20 generates an electrical signal as a read signal. The electrical signal drives a tracking device (not shown), which controls the motion of the optical head 13 so that the head 13 tracks the spiral pre-groove of the disk 11.

Figure 2:
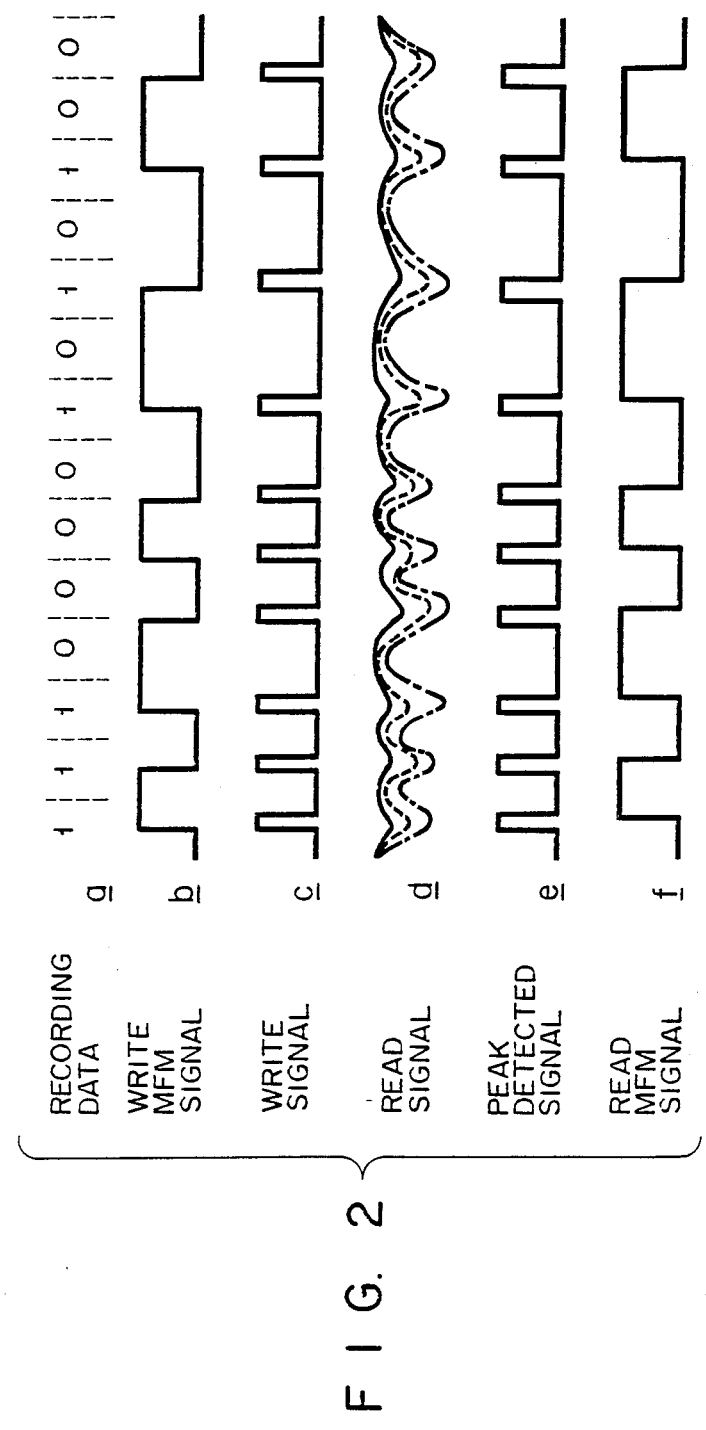
FIG. 2, consisting of a-f, is a timing chart illustrating the operation of the apparatus shown in FIG. 1.

Digital data a as shown in FIG. 2 are supplied to the pulse-width modulator 21. The modulator 21 performs pulse-width modulation on data a, thus generating a pulse signal b also shown in FIG. 2. Signal b is supplied to the pulse converter 22. The pulse converter 22 generates a write pulse signal c, shown in FIG. 2, which includes pulses having a predetermined width, in synchronism with the leading and trailing edges of the pulses of signal b. Write pulse signal c is supplied to the laser driver 23. The laser driver 23 changes the output energy of the semiconductor laser 14 in response to write pulse signal c.

More specifically, whenever write pulse signal c rises to a high level, the optical head 13 radiates a high-energy laser beam, or a recording beam, to the pre-groove of the optical disk 11, producing a pit in the pre-groove. Conversely, whenever write pulse signal c becomes a low level, the head 13 emits a low-energy laser beam to the pre-groove which is used for tracking and focusing.

If an erroneous focusing occurs during the data recording, the pit will be larger or smaller than the desired pit. Regardless of whether or not erroneous focusing occurs, pits will be formed in the spiral pre-groove at intervals which correspond to the time intervals of the pulses of signal c. When all digital data a are recorded in the form of pits cut in the pre-groove, the data recording is stopped. The optical disk 11 can then be used for data reproduction.

Data Reproduction

The motor 12 rotates the optical disk 11 in the same way as in data recording. The optical head 13 is set at a specific position with respect to the disk 11. A reproduction mode switch (not shown) is closed. The optical head 13 then continuously emits a low-energy laser beam, or a reproducing beam, to the recording surface of the optical disk 11. The low-energy laser beam is reflected from the disk 11 and guided to the photosensor 20. The photosensor 20 converts the beam into a read signal d as shown in FIG. 2. The waveform of read signal d is irregular due to a focusing error or the like which has occurred during data recording and/or reproduction. Read signal d is amplified by the amplifier 24. The output signal from the amplifier 24 is supplied to the peak detector 25. The peak detector 25 detects the peaks of the read signal d and generates a read pulse signal e as shown in FIG. 2.

Figure 3:
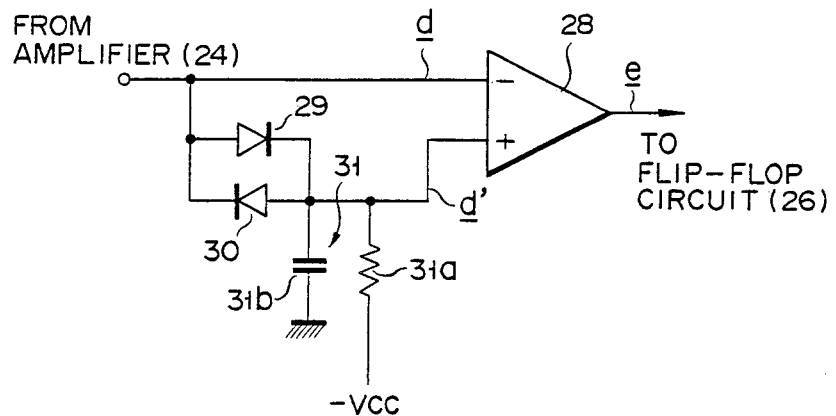
FIG. 3 is a circuit diagram of the peak detector used in the apparatus shown in FIG. 1.

As shown in FIG. 3, the peak detector 25 is comprised of an operational amplifier 28, two diodes 29 and 30 and an integrator 31. The non-inverting input terminal of the operational amplifier 28 is connected to the integrator 31 which is comprised of a resistor 31a and a capacitor 31b. The integrator 31 is connected to the output of the amplifier 24 through the diodes 29 and 30 of opposite polarity which are connected in parallel.

Figure 4:
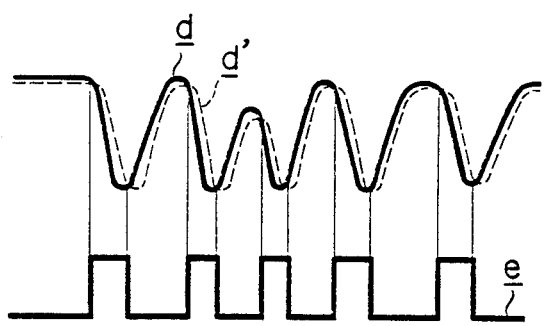
FIG. 4 shows the waveforms of signals, illustrating the operation of the peak detector shown in FIG. 3.

Read signal d amplified by the amplifier 24 is supplied directly to the inverting input terminal of the operational amplifier 28 and to the non-inverting input terminal of the operational amplifier 28 through the diodes 29 and 30 and through the integrator 31. Signal d' from the integrator 31 is slightly delayed with respect to signal d supplied to the inverting input terminal of the operational amplifier 28. Signal d has a waveform indicated by a solid line in FIG. 4, and signal d' a waveform indicated by a broken line in FIG. 4. The operational amplifier 28 generates a pulse signal e shown in FIG. 4. As is evident from FIG. 4, pulse signal e has pulses each generated while the level of signal d' remains higher than that of signal d. The distance between the trailing edges of any two adjacent pulses of signal e is substantially equal to the distance between the negative peaks of the corresponding two adjacent waves of signal d. Hence, pulse signal e can be regarded as representing the negative peaks of electrical signal d from the photosensor 20. As shown in FIG. 2, pulse signal e is substantially identical to output pulse signal c from the pulse converter 22 with respect to intervals of pulses.

Pulse signal e is supplied to the flip-flop circuit 26. The flip-flop circuit 26 generates a pulse signal f as shown in FIG. 2. Obviously, pulse signal f is substantially identical with pulse signal b from the modulator 21 with respect to intervals of pulses. Signal f is supplied to the pulse-width demodulator 27. The demodulator 27 performs pulse-width demodulation on pulse signal f, thereby reproducing digital data a. Data a thus reproduced are supplied to, for example, a display unit (not shown) and displayed in the form of an image.

As described above, according to the present invention, a pulse converter receives a pulse signal generated by a pulse-width modulator and corresponding to digital data to be recorded. The pulse converter generates a write pulse signal having pulses which are synchronous with the leading and trailing edges of the pulses of the signal from the modulator and which have a predetermined width. In response to the pulses of the signal, a laser intermittently radiates a high-energy light beam to the recording surface of an optical disk, thus forming pits in the disk. Since the intervals between the pits are used as recorded data, the pits can represent correct data even if their sizes are incorrect due to a focusing error. Therefore, the apparatus according to the invention can correctly record and reproduce data on an optical disk.

The embodiment of the invention described above uses a semiconductor laser as a laser beam radiating means. Another kind of laser may be used according to the present invention.

What we claim is:

1. A data recording and reproducing apparatus comprising:
    pulse converter means, connected to receive a pulse-width modulated data signal, for generating a write pulse signal including pulses which have a predetermined width and which are synchronous with the leading and trailing edges of the pulses of said pulse-width modulated data signal;

light beam radiating means, connected to receive said write pulse signal, for radiating a reproducing light beam toward a spinning optical disk, and for selectively radiating a recording light beam toward the optical disk in response to pulses of the write pulse signal to form pits on the disk;

photosensing means for receiving the portion of the reproducing light beam which is reflected by the optical disk and for converting said portion into a read signal, said read signal including peak components each corresponding to the light intensity of that portion of the reproducing light beam reflected from a pit on the disk;

peak detecting means connected to receive said read signal for generating a first series of output pulses, each of the first series of output pulses having an edge portion synchronous with a peak component of said read signal; and reproducing means for generating a second series of output pulses, the widths of said second series of output pulses determined in proportion to the interval between the edge portions of succeeding pulses in said first series of output pulses, said second series of output pulses corresponding to said pulse-width modulated data signal.

2. A data recording and reproducing apparatus according to claim 1, further comprising:

modulating means for generating said pulse-width modulated data signal in response to a data signal applied thereto; and demodulating means connected to said reproducing means for pulse-width demodulating said second series of output pulses.

3. A data recording and reproducing apparatus according to claim 2, wherein said modulating means includes a modified frequency modulator, and said demodulating means includes a modified frequency demodulator.

4. A data recording and reproducing apparatus according to claim 1, wherein said reproducing means comprises a flip-flop circuit which responds to the trailing edges of said first series of output pulses, thereby generating said second series of output pulses.

5. A data recording and reproducing apparatus according to claim 1, wherein said pulse converter means comprises a monostable multivibrator.

6. A data recording and reproducing apparatus according to claim 1, wherein said light beam radiating means includes a semiconductor laser.

7. A data recording and reproducing apparatus according to claim 1, wherein said light beam radiating means includes a semiconductor laser and a laser driver.

8. A data recording and reproducing apparatus according to claim 1, wherein said light beam radiating means and said photosensing means form an optical head.

9. A data recording and reproducing apparatus according to claim 1, wherein said peak detecting means comprises:

delaying means for delaying said read signal; and comparing means, connected to the output of said photosensing means and to the output of said delaying means, for comparing the read signal with the delayed read signal to produce said first series of output pulses.

10. An apparatus for recording information onto and reproducing information from a spinning optical disk, including:

means, connected to receive a pulse-modulated data signal, for producing write pulses of uniform width in response to edges of said pulse-modulated data signal;

light emitting means for producing pits of substantially uniform length on said spinning disk in response to said write pulses;

light receiving means for producing a read pulse corresponding to each pit on said spinning disk in response to light reflected from said disk; and means for producing a data signal in response to the spacing between said read pulses, said data signal being a reproduction of said pulse modulated data signal.

11. A method for recording and reproducing data comprising the steps of:

(1) pulse-width modulating a signal with data to be recorded to generate a modulated pulse signal;

(2) generating a write pulse signal comprising pulses which have a predetermined width and are synchronous with the leading and trailing edges of the pulses of the modulated pulse signal produced by said modulating step (1);

(3) selectively radiating a recording light beam toward a spinning optical disk in response to the pusles of the write pulse signal produced by said write pulse signal generating step (2) to produce pits in said disk;

(4) subsequent to said radiating step (3), radiating a reproducing light beam toward said spinning optical disk;

(5) receiving a portion of said reproducing light beam reflected by the spinning optical disk;

(6) converting said received portion into an electrical read signal including peak components each corresponding to the light intensity of that portion of the reproducing light beam reflected from said pits produced by said radiating step (3);

(7) generating a first series of output pulses, each of the pulses in said first series having an edge portion synchronous with a peak component of said read signal produced by said converting step (6); and (8) generating a second series of output pulses, the widths of said second series of output pulses each determined in proportion to the interval between the edge portions of succeeding pulses in said first series of output pulses, said second series of output pulses corresponding to the modulated pulse signal produced by said modulating step (1).

12. A method for recording and reproducing data comprising the steps of:

(1) pulse-width modulating a signal with data to be recorded to generate a modulated pulse signal;

(2) generating a write pulse signal comprising pulses which have a predetermined width and which are synchronous with the leading and trailing edges of the pulses of the modulated pulse signal produced by said modulating step (1);

(3) selectively radiating a recording light beam toward a spinning optical disk in response to the pulses of the write pulse signal produced by said write pulse signal generating step (2) to produce pits in said disk;

(4) subsequent to said radiating step (3), radiating a reproducing light beam toward said spinning optical disk;

(5) receiving a portion of said reproducing light beam reflected from the spinning optical disk;

(6) converting said received portion into an electrical read signal;

(7) generating a read pulse signal including pulses produced in response to the peak components of said read signal produced by said converting step (6); and (8) converting the read pulse signal produced by said generating step (7) into reproduction data corresponding to said modulated pulse signal produced by said modulating step (1).

13. A method for recording information onto and reproducing information from a spinning optical disk, including the steps of:

(1) producing write pulses of uniform width in response to edges of a pulse-modulated data signal;

(2) producing pits of substantially uniform length on said spinning disk in response to said write pulses;

(3) producing a read pulse corresponding to each pit on said disk in response to light reflected from said disk; and (4) producing a data signal in response to the spacing between said read pulses, said data signal being a reproduction of said pulse-modulated data signal.

* * * * *